United States Patent [19]

Kawahara et al.

[11] Patent Number: 4,893,548

[45] Date of Patent: Jan. 16, 1990

[54] HYDRAULICALLY OPERATED SWASH-TYPE APPARATUS

[75] Inventors: Eiichiro Kawahara; Mitsumasa Furumoto, both of Saitama; Takashi Koyama, Tokyo, all of Japan

[73] Assignee: Honda Giken Kogyo Kabushiki Kaisha, Tokyo, Japan

[21] Appl. No.: 132,192

[22] Filed: Dec. 14, 1987

[30] Foreign Application Priority Data

Dec. 12, 1986 [JP] Japan .................. 61-296244

[51] Int. Cl.$^4$ ............................................. F04B 1/22
[52] U.S. Cl. ........................................ 91/499; 91/488; 92/71
[58] Field of Search ................ 91/488, 499; 92/12.2, 92/71, 187; 384/9, 42; 184/6.17

[56] References Cited

U.S. PATENT DOCUMENTS

| | | | |
|---|---|---|---|
| 2,721,519 | 10/1955 | Henrichsen | 91/473 |
| 3,075,472 | 1/1963 | Garnier | 91/506 |
| 3,084,633 | 4/1963 | Henrichsen | 91/488 |
| 3,108,544 | 10/1963 | Pesce . | |
| 3,131,539 | 5/1964 | Creighton . | |
| 3,143,858 | 8/1964 | Roeske . | |
| 3,190,232 | 6/1965 | Budzich . | |
| 3,295,459 | 1/1967 | Griffith | 91/488 |
| 3,364,680 | 1/1968 | Osojnak . | |
| 3,521,532 | 7/1970 | Espig | 91/499 |
| 3,739,691 | 6/1973 | Bobier | 91/506 |
| 3,866,518 | 2/1975 | Miyao | 91/488 |
| 3,890,883 | 6/1975 | Rometsch | 91/499 |
| 4,444,093 | 4/1984 | Koga | 91/488 |
| 4,478,134 | 10/1984 | Kawahara | 91/488 |
| 4,637,293 | 1/1987 | Yamaguchi | 91/507 |

FOREIGN PATENT DOCUMENTS

| | | | |
|---|---|---|---|
| 47901 | 1/1979 | Japan | 417/269 |
| 54-134252 | 10/1979 | Japan . | |
| 54-134253 | 10/1979 | Japan . | |
| 55-27556 | 2/1980 | Japan . | |
| 48205 | 5/1982 | Japan | 91/488 |
| 59-38467 | 9/1984 | Japan . | |

Primary Examiner—Leonard E. Smith
Attorney, Agent, or Firm—Lyon & Lyon

[57] ABSTRACT

A hydraulically operated, swash-plate apparatus such as a hydraulically operated continuously variable transmission includes a cylinder block rotatably supported in a case and having a plurality of axial cylinders arranged in an annular pattern, plungers received respectively in the cylinders, and a swash plate supported in the case and slidably held against the free ends of the plungers through a shoe therebetween. The plungers are movable into and out of the respective cylinders by a stroke determined by the angle of inclination of the swash plate. The shoe having a body and a sliding surface disposed thereon and slidably held against the swash plate and made of a material having a coefficient of thermal expansion different from that of the body of the shoe. The sliding surface becomes convex at a temperature upon operation of the apparatus.

7 Claims, 3 Drawing Sheets

HYDRAULICALLY OPERATED SWASH-TYPE APPARATUS

BACKGROUND OF THE INVENTION

The present invention relates to a hydraulically operated swash-plate apparatus such as a hydraulically operated continuously variable transmission including a hydraulic pump and a hydraulic motor which are interconnected by a closed hydraulic circuit, and more particularly to a shoe structure in such a hydraulically operated swash-type apparatus.

There have been known hydraulically operated swash-type apparatus such as hydraulically operated continuously variable transmissions for use in automobiles, including a cylinder block rotatably supported in a case and having a plurality of axial cylinders arranged in an annular pattern, plungers received respectively in the cylinders, and a swash plate supported in the case and slidably held against the free ends of the plungers through a shoe. The stroke by which the plungers can move into and out of the respective cylinders is determined according to the angle of inclination of the swash plate.

Since the distal ends of the plungers are held in slidable contact with the swash plate through the shoe, the contacting surfaces of the shoe and the swash plate must be lubricated in order to reduce friction therebetween. One known arrangement for such lubrication is disclosed in Japanese Laid-Open Patent Publication No. 55-27556. According to the known structure, the plungers have holes defined therethrough for introducing part of working oil therethrough via the contacting surfaces of the shoe and the plungers to the sliding surfaces of the shoe and the swash plate so as to form a film of oil therebetween. In order not to break the oil film thus formed, the sliding surface of the shoe should appropriately be shaped. More specifically, the outer peripheral edge of the shoe should preferably be beveled. For forming a desired oil film while keeping a prescribed oil pressure, the sliding surface of the shoe should preferably be slightly convex. To form such a surface, however, a precise machining process is required, and hence the cost of manufacture of the hydraulically operated swash-type apparatus is increased.

SUMMARY OF THE INVENTION

In view of the aforesaid drawback of the prior art, it is an object of the present invention to provide a hydraulically operated swash-type apparatus having a shoe structure capable of forming a suitable oil wedge between a shoe and a swash plate without requiring precise machining.

According to the present invention, the above object can be accomplished by a hydraulically operated swash-plate apparatus including a cylinder block rotatably supported in a case and having a plurality of axial cylinders arranged in an annular pattern, plungers received respectively in the cylinders, and a swash plate supported in the case and slidably held against the free ends of the plungers through a shoe therebetween, the plungers being movable into and out of the respective cylinders by a stroke determined by the angle of inclination of the swash plate, the shoe having a body and a sliding surface disposed thereon and slidably held against the swash plate and made of a material having a coefficient of thermal expansion different from that of the body of the shoe, the arrangement being such that the sliding surface becomes convex at a temperature of operation of the apparatus.

With the above arrangement, by suitably selecting the material of the body of the shoe and the material of the sliding surface of the shoe, the sliding surface of the shoe becomes convex on a bimetal principle at the temperature of operation of the apparatus.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
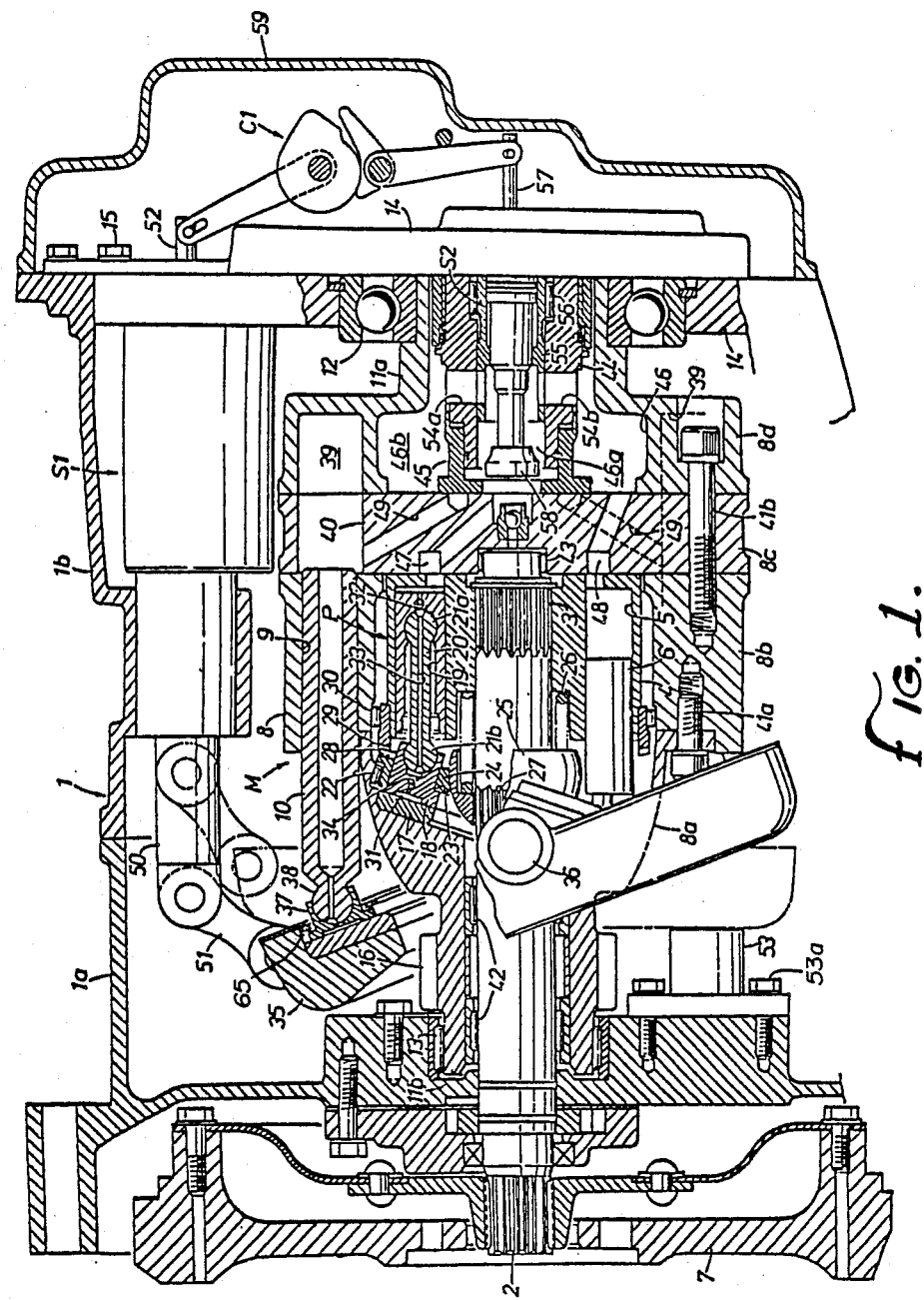
FIG. 1 is a longitudinal cross-sectional view of a hydraulically operated, continuously variable transmission according to the present invention.

FIG. 1 shows a hydraulically operated swash-plate apparatus according to the present invention, the apparatus shown here being in the form of a hydraulically operated continuously variable transmission for use in a motor vehicle such as an automobile. The transmission basically comprising a hydraulic pump P and a hydraulic motor M housed in a transmission case 1 composed of a pair of longitudinally separated case members 1a, 1b.

The hydraulic pump P has a pump cylinder 4 splined to an end 3 of an input shaft 2, a plurality of cylinder holes or bores 5 defined in the pump cylinder 4 in a circular pattern around and concentric with the input shaft 2 and extending parallel to the input shaft 2, and a plurality of pump plungers 6 slidably fitted respectively in the cylinder holes 5. The hydraulic pump P can be driven by the power of an engine (not shown) which is transmitted through a flywheel 7 coupled to the opposite end of the input shaft 2.

The hydraulic motor M has a motor cylinder 8 disposed in surrounding relation to the pump cylinder 4, a plurality of cylinder holes or bores 9 defined in the motor cylinder 8 in a circular pattern around and concentric with the input shaft 2 and extending parallel to the input shaft 2, and a plurality of motor plungers 10 slidably fitted relative in the cylinder holes 9. The hydraulic motor M is rotatable relatively to the pump cylinder 4 in concentric relation thereto.

The motor cylinder 8 has axially opposite ends on which a pair of support shafts 11a, 11b is disposed, respectively. The support shaft 11a is rotatably supported on the axial end wall of the case member 1b by means of a ball bearing 12, and the support shaft 11b is rotatably supported on the axial end wall of the case member 1a by means of a needle bearing 13. A holder plate 14 is fixed by bolts 15 to the axial end wall of the case member 1b. The ball bearing 12 and the support shaft 11a are thus fixedly mounted on the case member 1b against axial movement. The other support shaft 11b has an integral spur gear 16 for transmitting output power of the hydraulic motor M through a differential gear mechanism (not shown) to an outside member.

A pump swash plate 17 inclined at an angle to the pump plungers 6 is fixedly disposed radially inwardly of the motor cylinder 8. An annular pump shoe 18 is rotatably slidably supported on an inclined surface of the pump swash plate 17.

Each of the pump plungers 6 has a bottomed hole 19 opening toward the pump swash plate 17. A connecting rod 20 inserted in the bottomed hole 19 is pivotally movable with respect to the pump plunger 6 by means of a ball joint 21a on the inner end of the connecting rod 20. The connecting rod 20 projects out of the corresponding pump plunger 6 from the bottomed hole 19, and is pivotally movable with respect to the pump shoe 18 by means of a ball joint 21b on the outer projecting end of the connecting rod 20.

The annular pump shoe 18 has its outer peripheral surface supported in the motor cylinder 8 by a needle bearing 22. The annular pump shoe 18 has an annular step 23 defined in its inner peripheral surface facing the pump plungers 6. A presser ring 24 riding in the annular step 23 presses the pump shoe 18 toward the pump swash plate 17 under the resiliency of a compression coil spring 26 disposed under compression around the input shaft 2 and acting on a spring holder 25 held against the presser ring 24. The spring holder 25 is slidably fitted over splines 27 on the input shaft 2, and has a partly spherical surface contacting a complementary partly spherical surface of the presser ring 24. Therefore, the spring holder 25 is neatly held against the presser ring 24 for transmitting the resilient force from the spring 26 to the presser ring 24 irrespective of how the spring holder 25 and the presser ring 24 are relatively positioned.

Thus, the pump shoe 18 can be slidingly rotated in a fixed position on the pump swash plate 17 at all times.

The pump shoe 18 has a crown gear 28 on the end face thereof facing the pump cylinder 4, the crown gear 28 extending around the outer periphery of the pump shoe 18. A bevel gear 29, which has the same number of teeth as the crown gear 28, is fixed to the outer periphery of the pump cylinder 4, and held in mesh with the crown gear 28. When the pump cylinder 4 is driven to rotate by the input shaft 2, the pump shoe 18 is rotated in synchronism with the pump cylinder 4 through the meshing gears 28, 29. On rotation of the pump shoe 18, those pump plungers 6 which run along an ascending side of the inclined surface of the pump swash plate 17 are moved in a discharge stroke by the pump swash plate 17, the pump shoe 18, and the connecting rods 20, and those pump plungers 6 which travel along a descending side of the inclined surface of the pump swash plate 17 are moved in a suction stroke.

A needle bearing 30 is disposed between the outer peripheral surface of the bevel gear 29 and the inner peripheral surface of the motor cylinder 8. Therefore, concentric relative rotation of the pump cylinder 4 and the motor cylinder 8 is performed with increased accuracy.

The pump shoe 18 has hydraulic pockets 31 defined in its surface held against the pump swash plate 17 and positioned in alignment with the respective connecting rods 20. The hydraulic pockets 31 communicate with the respective oil chambers in the pump cylinder 4 through oil holes 32 defined in the pump plungers 6, oil holes 33 defined in the connecting rods 20, and oil holes 34 defined in the pump shoe 18. While the pump cylinder 4 is in operation, therefore, oil under pressure in the pump cylinder 4 is supplied to the hydraulic pockets 31 to apply a hydraulic pressure to the pump shoe 18 in a direction to bear the thrust force imposed by the pump plungers 6 on the pump shoe 18. Therefore, the oil supplied to the hydraulic pockets 31 serves to reduce the pressure under which the pump shoe 19 contacts the pump swash plate 17, and also to lubricate the mutually sliding surfaces of the pump shoe 18 and the pump swash plate 17.

A motor swash plate 35 is tiltably supported in the transmission case 1 by means of a pair of trunnions 36 projecting from opposite sides of the motor swash plate 35, which is held in confronting relation to the motor plungers 10. The motor swash plate 35 has an inclined surface on which there is slidably disposed a motor shoe 37 that is pivotally coupled to ball joints 38 on the outer ends of the motor plungers 10. A retainer 65 is mounted on an outer peripheral edge near the sliding surface thereof for preventing the shoe 37 from dropping off the sliding surface when the motor plungers 10 lose their pressing forces upon engine braking, for example.

Each of the motor plungers 10 reciprocally moves in expansion and compression strokes while rotating the motor cylinder 8. The stroke of the motor plungers 10 can continuously be adjusted from zero to a maximum level by varying the angle of inclination of the motor swash plate 35 from a vertical position (shown by the two-dot-dash lines) in which the motor swash plate 35 lies perpendicularly to the motor plungers 10 to a most inclined position (shown by the solid lines).

The motor cylinder 8 comprises axially separate first through fourth members or segments 8a through 8d. The first member 8a includes the support shaft 11b and accommodates the pump swash plate 17. The second member 8b has guide holes in the cylinder holes 9, in which the motor plungers 10 are slidably guided, respectively. The third and fourth members 8c, 8d have oil chambers 39 in the cylinder holes 9, the oil chambers 39 being slightly larger in diameter than the guide holes in the cylinder holes 9. The third member 8c serves as a distribution member 40 having oil passages leading to the cylinder holes 5, 9, and the fourth member 8d includes the support shaft 11a. The first through fourth members 8a–8d are relatively positioned by knock pins, for example, inserted in their mating end faces, and are firmly coupled together by means of a plurality of bolts 41a, 41b.

The input shaft 2 has an outer end portion rotatably supported centrally in the support shaft 11b of the motor cylinder 8 by a needle bearing 42, and an inner end portion rotatably supported centrally in the distribution member 40 by a needle bearing 43.

The spring 26 is disposed under compression between the pump cylinder 4 and the spring holder 25 for pressing the pump cylinder 4 against the distribution member 40 to prevent oil from leaking from between the sliding surfaces of the pump cylinder 4 and the distribution member 40. The resilient force of the spring 26 is also effective in supporting the spring holder 25, the presser ring 24, the pump shoe 18, and the pump swash plate 17 firmly in the motor cylinder 8, as described above.

The support shaft 11a is of a hollow structure in which a fixed shaft 44 is centrally inserted. A distribution ring 45 is fitted over the inner end of the fixed shaft 44 in a fluid-tight manner through an O-ring therebetween. The distribution ring 45 has an axial end face held in sliding contact with the distribution member 40 eccentrically with respect to the center of rotation of the input shaft 2. The fourth member 8d of the motor cylinder 8 has an interior hollow space 46 which is divided by the distribution ring 45 into an inner oil chamber 46a and an outer oil chamber 46b.

The distribution member 40 has an outlet port 47 and an inlet port 48. The outlet port 47 provides fluid communication between the cylinder holes 5 that receive the pump plungers 6 operating in the discharge stroke and the inner oil chamber 46a. The inlet port 48 provides fluid communication between the cylinder holes 5 that receive the pump plungers 6 operating in the suction stroke and the outer oil chamber 46b. The distribution member 40 also has a number of communication ports 49 defined therein and through which the cylinder holes 9 of the motor cylinder 8 communicate with the interior space 46 in the fourth member 8d.

The communication ports 49 open into the interior space 46 at equally spaced locations on a circle around the axis of rotation of the hydraulic motor M. The distribution ring 45 is slidably held against the distribution member 40 in eccentric relation, as described above. Therefore, in response to rotation of the motor cylinder 8, the communication ports 49 are caused by the distribution ring 46 slidingly held against the distribution member 40 to successively communicate with the inner and outer oil chambers 46a, 46b.

Therefore, a closed hydraulic circuit is formed between the hydraulic pump P and the hydraulic motor M through the distribution member 40 and the distribution ring 45. When the pump cylinder 4 is driven by the input shaft 2, high-pressure working oil discharged by the pump plungers 6 in the discharge stroke flows from the outlet port 47, the inner oil chamber 46a, and the communication ports 49 communicating with the inner oil chamber 46a into the cylinder holes 9 receiving the motor plungers 10 which are in the expansion stroke, thereby imposing a thrust on these motor plungers 10.

Working oil discharged by the motor plungers 10 operating in the compression stroke flows through the communication ports 49 communicating with the outer oil chamber 46b and the inlet port 48 into the cylinder holes 5 receiving the pump plungers 6 in the suction stroke. Upon such circulation of the working oil, the motor cylinder 8 is driven by the sum of the reactive torque applied by the pump plungers 6 in the discharge stroke to the motor cylinder 8 through the pump swash plate 17 and the reactive torque received by the motor plungers 10 in the expansion stroke from the motor swash plate 35.

The transmission ratio of the motor cylinder 8 to the pump cylinder 4 is given by the following equation:

$$\text{Transmission ratio} = \frac{\text{Rotational speed of pump cylinder 4}}{\text{Rotational speed of motor cylinder 8}} =$$

$$1 + \frac{\text{Displacement of hydraulic motor } M}{\text{Displacement of hydraulic pump } P}$$

It can be understood from the above equation that the transmission ratio can be varied from 1 to a desired value by varying the displacement of the hydraulic motor M from zero to a certain value.

Since the displacement of the hydraulic motor M is determined by the stroke of the motor plungers 10, the transmission ratio can continuously be adjusted from 1 to a certain value by tilting the motor swash plate 35 from the vertical position to a certain inclined position.

A hydraulic ratio-changing servomotor S1 for tilting the motor swash plate 35 is disposed in an upper portion of the transmission case 1. The ratio-changing servomotor S1 has a piston rod 50 having an end projecting into the transmission case 1. The projecting end of the piston rod 50 is coupled to the motor swash plate 35 through a connector 51 and pivot pins. The servomotor S1 has a pilot valve 52, and the outer end of the pilot valve 52 projecting through the holder plate 14 is coupled to a cam mechanism C1. The motor swash plate 35 is remotely controlled by a control device (not shown) through the servomotor S1 and the cam mechanism C1.

The ratio-changing servomotor S1 is of the known type in which a piston therein is reciprocally operated in amplified movement by following the movement of the pilot valve 52 which is given by the control device. In response to operation of the servomotor S1, the motor swash plate 35 can continuously be angularly shifted or adjusted from the most inclined position indicated by the solid lines in FIG. 1 where the transmission ratio is maximum to the least inclined position indicated by the imaginary (two-dot-and-dash) lines where the transmission ratio is minimum.

A stopper 53 is interposed between the motor swash plate 35 and the end wall of the case member 1a for limiting the mechanical least inclined position of the motor swash plate 35.

The stopper 53 is fastened to an end plate of the case member 1a by means of bolts 53a. By replacing the stopper 53 with one of a suitable thickness as required, the neutral position of the swash plate 35 can easily and freely be adjusted. Since the back surface of the swash plate 35 is not intended for any special purpose and its pressure bearing surface area can sufficiently be large, the contacting surfaces of the stopper 53 are the swash plate 35 is not subject to rapid wear.

The fixed shaft 44 is of a hollow construction having a peripheral wall having radial connecting ports 54a, 54b through which the inner and outer oil chambers 46a, 46b communicate with each other. A cylindrical clutch valve 55 is fitted in the interior space of the fixed shaft 44 for selectively opening and closing the ports 54a, 54b, the clutch valve 55 being rotatable relatively to the fixed shaft 44 through a needle bearing 56. The clutch valve 55 serves as a clutch for selectively connecting and disconnecting the hydraulic pump P and the hydraulic motor M. The clutch valve 55 is operatively coupled to a clutch control unit (not shown). When the ports 54a, 54b are fully opened, the clutch is in an "OFF" position. When the ports 54a, 54b are partly opened, the clutch is in a "partly ON" position. When the ports 54a, 54b are fully closed, the clutch is in an "ON" position. With the clutch OFF as shown, working oil discharged from the outlet port 47 into the inner oil chamber 46a flows through the ports 54a, 54b and the outer oil chamber 46b directly into the inlet port 48, making the hydraulic motor M inoperative. When the clutch is ON, the above oil flow is shut off, and working oil is circulated from the hydraulic pump P to the hydraulic motor M, allowing hydraulic power to be transmitted from the hydraulic pump P to the hydraulic motor M.

A servomotor S2 for selectively making and breaking the hydraulic circuit is disposed centrally in the hollow clutch valve 55. The servomotor S2 is operatively coupled to the ratio-changing servomotor S1 through the cam mechanism C1. When a pilot valve 57 of the servomotor S2 which projects out from the holder plate 14 is pushed, a shoe 58 on the distal end of the servomotor S2 closes the open end of the outlet port 47 in the distribution member 40 for thereby cutting off the flow of working oil from the outlet port 47 into the inner oil chamber 46a.

With the oil flow thus cut off, the pump plungers 6 are hydraulically locked and the hydraulic pump P and the hydraulic motor M are directly connected to each other, so that the motor cylinder 8 can mechanically be driven by the pump cylinder 4 through the pump plungers 6 and the pump swash plate 17. The hydraulic pump P and the hydraulic motor M are directly interconnected in this manner when the motor swash plate 35 is vertically positioned for the minimum transmission ratio. In this transmission position, the efficiency of transmission of power from the input shaft to the output shaft is increased, and the thrust applied by the motor plungers 10 to the motor swash plate 35 is reduced, thus lessening the stresses on the bearings and other members.

The cam mechanism C1, the holder plate 14, and other members are covered with an end cover 59 attached to the righthand side end of the transmission case 1

Figure 2:
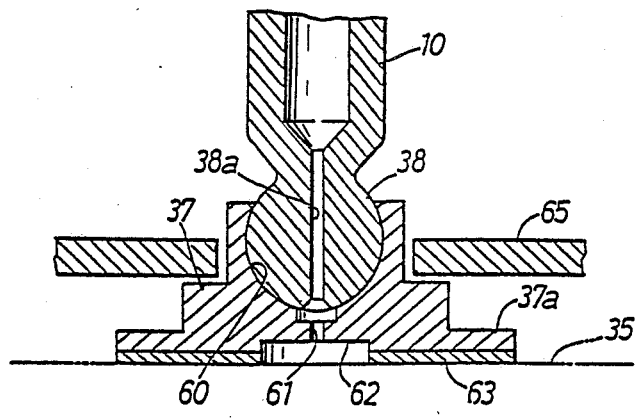
FIG. 2 is an enlarged cross-sectional view of a shoe and associated components in the transmission.
Figure 3:
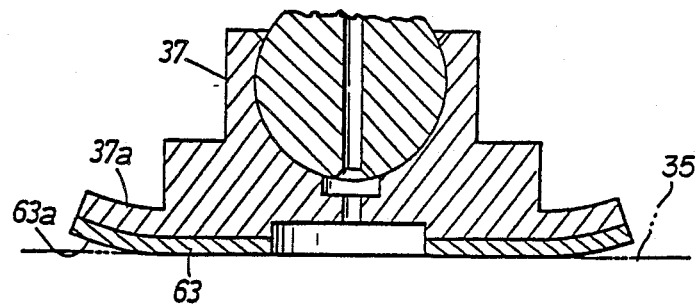
FIG. 3 is an enlarged cross-sectional view showing the shoe of FIG. 2 at a temperature of operation of the transmission.

FIGS. 2 and 3 show in detail the motor shoe 37 as it is not operated and it is operated, respectively. The shoe 37 has a spherical supporting surface 60 slidably supporting the ball joint 38 on the free end of each motor plunger 10, and a relatively thin outer peripheral member 37a. The ball joint 38 has a through hole 38a defined therethrough. With the ball joint 38 supported on the supporting surface 60, part of the working oil in the motor plunger 10 is supplied through the hole 38a and a hole 61 defined centrally in the shoe 37 to a hydraulic pocket 62 defined centrally in the sliding surface of the shoe 37. Therefore, the working oil is supplied via the holes 38a, 61 to the hydraulic pocket 62 to form an oil film between the sliding surfaces of the shoe 37 and the motor swash plate 35.

A plate 63 having a larger coefficient of thermal expansion than that of the body of the shoe 37 itself is disposed on and pressed against the surface of the shoe 37 around the hydraulic pocket 62. The plate 63 has a sliding surface 63a slidably held against the motor swash plate 35. When the temperature of the shoe 37 is increased upon operation of the apparatus, the plate 63 expands to a larger degree than the shoe 37 itself as shown in FIG. 3. Inasmuch as the outer peripheral member 37a of the shoe 37 is relatively thin, the outer edge portion of the plate 63 and the corresponding portion of the shoe 37 are deformed in a direction away from the sliding surface of the motor swash plate 35. Thus, the sliding surface 63a of the plate 63 becomes somewhat convex.

When the apparatus is in operation, therefore, the sliding surface 63a of the shoe 37 runs on an oil film formed while forming an oil wedge, and is well lubricated.

Figure 4:
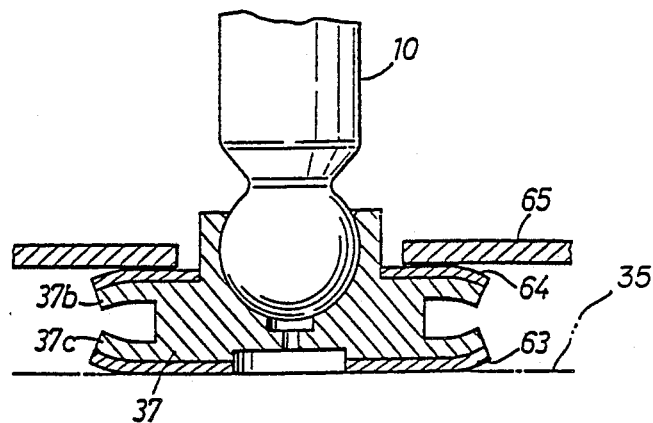
FIGS. 4 and 5 are enlarged cross-sectional views similar to FIG. 2, showing shoe structures according to other embodiments of the present invention.

FIG. 4 shows a shoe structure according to a second embodiment of the present invention. In this embodiment, the shoe 37 is sandwiched between the retainer 65 and the swash plate 35 while running on the sliding surface of the swash plate 35. The shoe 37 has thin outer peripheral members 37b, 37c near the retainer 65 and the swash plate 35, respectively. Plates 63, 64 having a larger coefficient of thermal expansion than that of the body of the shoe 37 itself are disposed on the surfaces of the shoe 37 which confront the retainer 65 and the swash plate 35, respectively. During operation of the apparatus, the sliding surfaces of the plates 63, 64 against the retainer 65 and the swash plate 35 become convex for thereby forming suitable oil suitable wedges for better lubrication.

Figure 5:
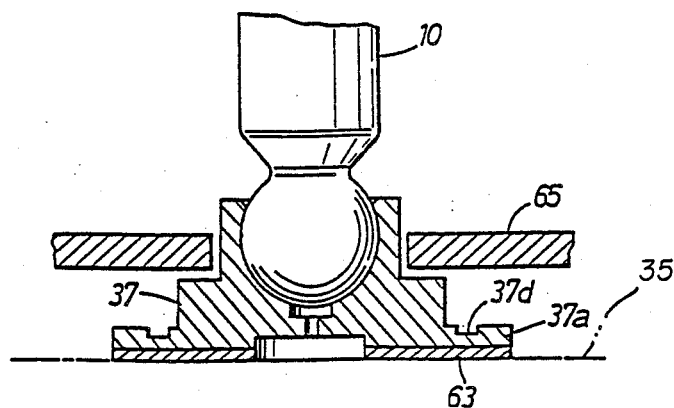

According to a third embodiment shown in FIG. 5, a shoe structure is similar to that according to the first embodiment of FIGS. 2 and 3, except that an annular groove 37d is defined in the thin outer peripheral member 37a of the shoe 37 in its surface remote from the plate 63, so that the outer peripheral member 37a is more easily deformable.

With the present invention, as described above, the shoe structure can reach a shape, during operation of the apparatus, which is suitable for forming an oil wedge to reduce friction between the shoe and the swash plate. The shoe structure can be constructed without any complex machining process. The shoe and the swash plate which are held in sliding contact with each other are well lubricated and hence highly durable, and the hydraulically operated apparatus is of increased efficiency.

Although certain preferred embodiments have been shown and described, it should be understood that many changes and modifications may be made therein without departing from the scope of the appended claims.

What is claimed is:

1. A hydraulically operated swash-plate apparatus comprising:

a case;

a cylinder block rotatably supported in said case and having a plurality of axial cylinders arranged in an annular pattern;

a plurality of plungers received respectively in said cylinders;

a swash plate supported in said case and slidably held against free ends of said plungers through a shoe therebetween, said plungers being movable into and out of said respective cylinders by a stroke determined by the angle of inclination of said swash plate; and said shoe having a body and a sliding surface disposed thereon and slidably held against said swash plate and made of a material having a coefficient of thermal expansion different from that of said body of said shoe, the arrangement being such that said sliding surface becomes convex at a temperature of operation of the apparatus.

2. A hydraulically operated swash-plate apparatus according to claim 1, wherein said body of said shoe has a relatively thin outer peripheral member, said sliding surface being disposed on said outer peripheral member.

3. A hydraulically operated swash-plate apparatus according to claim 2, wherein said outer peripheral member has an annular groove defined in a surface thereof remote from said sliding surface.

4. A hydraulically operated swash-plate apparatus according to claim 1, wherein said shoe has two sliding surfaces disposed respectively on opposite surfaces of said body and slidably held against said swash plate and a member spaced from and attached to said swash plate.

5. A hydraulically operated, swash-plate apparatus according to claim 1, wherein said body of said shoe has a relatively thin outer peripheral member, said sliding surface being disposed on said outer peripheral member in such a manner that at said temperature of operation of the apparatus said outer peripheral member and said sliding member cooperate to cause said outer peripheral member to deform away from said swash plate.

6. A hydraulically operated, swash-plate apparatus according to claim 1, wherein said sliding surface is a first sliding surface and said shoe has a first relatively thin outer peripheral member, said first sliding surface being disposed on said first outer peripheral member, said shoe further having a second sliding surface disposed on a surface opposite said first sliding surface and a second relatively thin outer peripheral member on which said second sliding surface is disposed, said second sliding surface being made of a material having a coefficient of thermal expansion different from that of said body of said shoe, the arrangement being such that said second sliding surface becomes convex at a temperature of operation of the apparatus.

7. A hydraulically operated, swash-plate apparatus according to claim 6, wherein said second sliding surface is slidably held against a member attached to said swash plate, said member being spaced from an area of slidable engagement of said shoe and said swashplate.

* * * * *